J. Surerus,
Pruning Implement,
No. 52,337.    Patented Jan. 30, 1866.
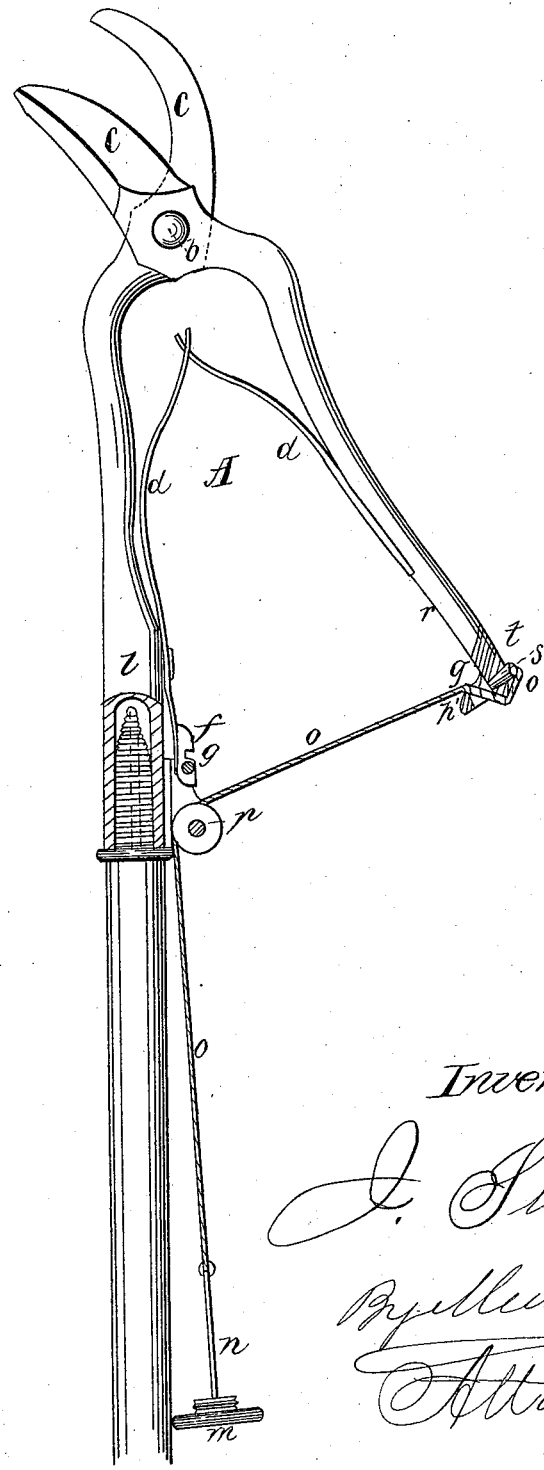
Witnesses
Inventor

UNITED STATES PATENT OFFICE.

JACOB SURERUS, OF NEWARK, NEW JERSEY.

IMPROVEMENT IN PRUNING-KNIVES.

Specification forming part of Letters Patent No. 52,337, dated January 30, 1866.

*To all whom it may concern:*

Be it known that I, JACOB SURERUS, of Newark, in the county of Essex and State of New Jersey, have invented a new and Improved Pruning-Knife; and I do hereby declare that the following is a full, clear, and exact description thereof, which will enable those skilled in the art to make and use the same.

The present invention relates to a pruning knife or shears, to be used for the trimming of trees, bushes, and other analogous purposes; and it consists in so constructing the knife that, whether to be used at a high or low point or part of the tree or bush, it can be readily adapted thereto, so that its blades can be operated to cut or sever the parts desired without requiring the person to ascend the tree to reach them in case they should be at any distance from the ground.

In accompanying plate my improved pruning knife or shears is illustrated, the figure representing a side view of the same with a portion of its handles broken out.

A in the drawings represents the pruning knife or shears, which consists of two shafts, $a$ $a$, pivoted together at $b$, and each with a sharp cutting blade or arm, $c$, as in ordinary shears, the blades $c$ being shown as opened from each other, bent springs $d$ $d$ upon the inside of each shaft holding them in such position, and throwing them open again when swung across each other by pulling the handles together. $f$ is a spring-catch hung upon one handle of the shears, which, by engaging its notch $g$ with the edge $h$ of the other handle, securely holds the two together.

The shears or knife constructed as above explained is used the same as with ordinary shears when the parts of the tree or bush to be trimmed are at or sufficiently near the ground to be within the reach of the person using it; but, if desired to trim a tree or bush at any point above the person's reach, I have so constructed the shears that with a slight adjustment thereof they can be then readily used and operated, such construction consisting in forming one handle, $l$, of the knife hollow, which is closed by a screw cap or plug, $m$, having wound upon its shaft or stem $n$ a cord or line, $o$, which cap, when the shears are to be used at high points, is unscrewed from the handle, its cord unwound and passed around a pulley, $p$, of said handle to and through the opening $q$ of the other handle, $r$, where it is inserted by its metallic cap or head $s$ in the aperture $t$ thereof. In the opening of the handle $l$ one end of a stick or rod is then inserted, as plainly shown by red lines in the drawings, which stick may be made of any desired length, according to the height at which it is desired to use the shears, the cord $o$ also being made of sufficient length that when the shears are thus raised it will be within reach of the person, so that by simply pulling upon it the blades of the shears will be properly operated to cut or sever the parts of the bush or tree desired, as is plainly obvious from the above, and by an inspection of the drawings, without further explanation.

What I claim as new, and desire to secure by Letters Patent, is—

The pruning-knife A, having hollow handle $l$, with screw-cap $m$, and cord $o$, passing around a pulley, $p$, of one handle and hung to the other, substantially as and for the purpose described, which cord and cap, when not in use, are incased within and by the said hollow handle, as specified.

The above specification of my invention signed by me this 10th day of November, 1865.

JACOB SURERUS.

Witnesses:
ALBERT W. BROWN,
M. M. LIVINGSTON.